United States Patent
Naruishi et al.

(10) Patent No.: US 8,493,225 B2
(45) Date of Patent: Jul. 23, 2013

(54) IMPACT DETECTOR AND PACKAGING CONTAINER

(75) Inventors: Moku Naruishi, Kawasaki (JP); Sakae Ishikawa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 377 days.

(21) Appl. No.: 12/923,498

(22) Filed: Sep. 24, 2010

(65) Prior Publication Data

US 2011/0090090 A1    Apr. 21, 2011

(30) Foreign Application Priority Data

Oct. 16, 2009 (JP) .................................. 2009-238887

(51) Int. Cl.
    *G08B 21/00* (2006.01)
(52) U.S. Cl.
    USPC .......................... 340/665; 340/669; 340/673
(58) Field of Classification Search
    None
    See application file for complete search history.

(56) References Cited

U.S. PATENT DOCUMENTS

| | | | |
|---|---|---|---|
| 4,060,004 A | 11/1977 | Scholz et al. | |
| 4,103,640 A | 8/1978 | Feder | |
| 8,074,489 B2 * | 12/2011 | Ishikawa et al. | 73/12.04 |
| 8,234,993 B2 * | 8/2012 | Naruishi et al. | 116/203 |
| 8,240,270 B2 * | 8/2012 | Naruishi | 116/203 |
| 8,307,775 B2 * | 11/2012 | Naruishi et al. | 116/203 |
| 2009/0249858 A1 * | 10/2009 | Ishikawa et al. | 73/12.06 |
| 2010/0050733 A1 | 3/2010 | Naruishi | |
| 2010/0180457 A1 * | 7/2010 | Katoh et al. | 33/366.11 |
| 2010/0281946 A1 | 11/2010 | Naruishi et al. | |
| 2010/0300178 A1 | 12/2010 | Naruishi et al. | |

FOREIGN PATENT DOCUMENTS

| | | |
|---|---|---|
| DE | 100 00 565 | 9/2001 |
| EP | 2 107 379 | 10/2009 |
| JP | 2009156726 A | 7/2009 |

OTHER PUBLICATIONS

European Search Report dated Jan. 19, 2012 issued in corresponding European Application No. 10251729.9.
Chinese Office Action dated Feb. 22, 2012 issued in corresponding Chinese Application No. 201010508648.1.

* cited by examiner

*Primary Examiner* — Travis Hunnings
(74) *Attorney, Agent, or Firm* — Harness, Dickey & Pierce, P.L.C.

(57) ABSTRACT

An impact detector includes a weight having a circular periphery, a case in which the weight is contained, an interior of which defines a transition path that connects an initial position and an impact detection position, and a restriction portion projecting from the interior of the case into the transition path. The weight moves through the transition path to the impact detection position with a circumferential surface of the weight in contact with the interior of the case when the case receives an impact in a predetermined direction, and the restriction portion restricts movement of the weight toward the impact detection position when the case receives impact in a direction other than the predetermined direction.

14 Claims, 12 Drawing Sheets

US 8,493,225 B2

IMPACT DETECTOR AND PACKAGING CONTAINER

CROSS REFERENCE TO RELATED APPLICATIONS

The present specification is based on and claims priority pursuant to 35 U.S.C. §119 from Japanese Patent Application No. 2009-238887, filed on Oct. 16, 2009 in the Japan Patent Office, which is hereby incorporated by reference herein in its entirety.

BACKGROUND OF THE INVENTION

1. Field of the Invention

The present invention relates to an impact detector to detect impact to an article and a packaging container including the impact detector.

2. Description of the Background Art

In the course of transport, it sometimes happens that fragile packaged articles such as precision equipment fall or are dropped due to inappropriate handling, accidents, or the like. The impact of the fall or drop can damage the articles. For this reason, therefore, impact detectors are typically attached to packaged articles to detect whether or not the article has been subjected to impact.

For example, JP-2009-156726-A discloses an impact detector shown in FIG. 16. Referring to FIG. 16, an impact detector 10 is for detecting impact of fall or drop of a packaged article. The impact detector 10 includes a leaf spring 3 and a weight 6, both disposed inside a case 2. The interior of the case 2 and the leaf spring 3 together form a vertical transition path 11, through which the weight 6 moves down when the case 2 is subjected to an impact in a vertical direction as well as lateral transition paths 12 through which the weight 6 moves when the case is subjected to an impact in a direction oblique to the vertical direction. In this known impact detector 10, the leaf spring 3 includes free ends 3a and projections 3b and 3c so that the position of the weight 6 in the vertical transition path 11 can differ depending on the magnitude of the impact. Thus, the impact detector 10 displays an impact history with the position of the weight 6.

In the impact detector 10, when the impact in the vertical direction, that is, the impact from below is relatively small, the weight 6 does not push away the upper projections 3c of the leaf spring 3 from each other and remains at an initial position indicated by a solid line. By contrast, when the impact from below is sufficiently great for the weight 6 to push away the projections 3c from each other, the weight 6 expands the gap between the projections 3c, moves down, and then is caught between the lower projections 3b. When the impact is greater, the weight 6 pushes away the lower projections 3b from each other and moves down to the bottom of the case 2. At that position, the weight 6 is visible through an inspection window formed in a bottom portion of the case 2. Additionally, with the projections 3b, the weight 6 does not move toward the initial position. By contrast, when the packaged article falls in a lateral direction, the weight 6 moves through the lateral transition path 12, beyond a curved portion 1a of the leaf spring 3, and stops below and to the side of the leaf spring 3 in FIG. 16. Thus, the known impact detector 10 detects impact (external force) on the package article in multiple different directions, that is, lateral fall and drop of the packaged article, and provides a record (history) of the impact distinguishable in multiple different directions.

Although the impact detector 10 is configured to detect both the drop and lateral fall of the packaged article and to guide the weight 6 to different positions depending on the type (magnitude and direction) of the impact, it is possible that a complicated combination of magnitude and twist of the external force can generate false reading by the impact detector 10. In other words, it is possible that the weight 6 moves through the lateral transition path 12 even when the packaged article has not fallen in the lateral direction.

In view of the foregoing, the inventors of the present inventions recognize that there is a need for a more accurate impact detector.

SUMMARY OF THE INVENTION

In view of the foregoing, one illustrative embodiment of the present invention provides an improved impact detector. The impact detector includes a weight having a circular periphery, a case in which the weight is contained, an interior of which defines a transition path that connects an initial position and an impact detection position, and a restriction portion projecting from the interior of the case into the transition path. The weight moves through the transition path to the impact detection position with a circumferential surface of the weight in contact with the interior of the case when the case receives an impact in a predetermined direction, and the restriction portion restricts movement of the weight toward the impact detection position when the case receives impact in a direction other than the predetermined direction.

In another illustrative embodiment, a packaging container includes a packaging container in which an article is contained and the above-described impact detector.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF PREFERRED EMBODIMENTS

Figure 1:
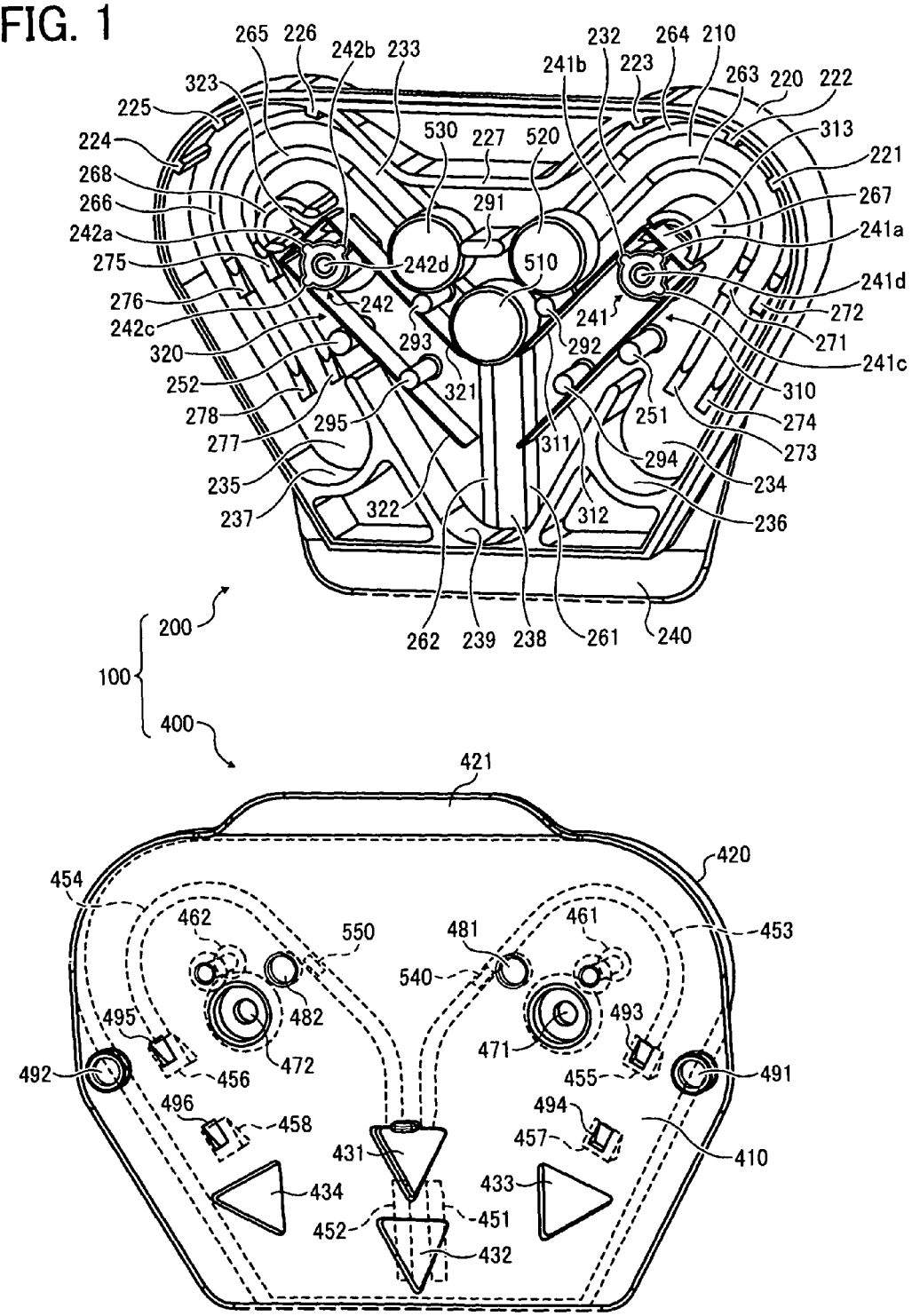
FIG. 1 is an exploded perspective view illustrating an impact detector according to an illustrative embodiment of the present invention.

In describing the embodiments illustrated in the drawings, specific terminology is employed for the purpose of clarity. However, the disclosure of this patent specification is not intended to be limited to the specific terminology so used, and it is to be understood that substitutions for each specific element can include any technical equivalents that operate in a similar manner.

Referring now to the drawings, wherein like reference numerals designate identical or corresponding parts throughout the several views, particularly to FIGS. 1 through 5, a first embodiment of the present invention will be described below.

It is to be noted that "displaying or providing impact history" in this specification simply means displaying falling events of a packaged article to which the impact detector is attached and does not mean showing the falling events chronologically.

Figure 2:
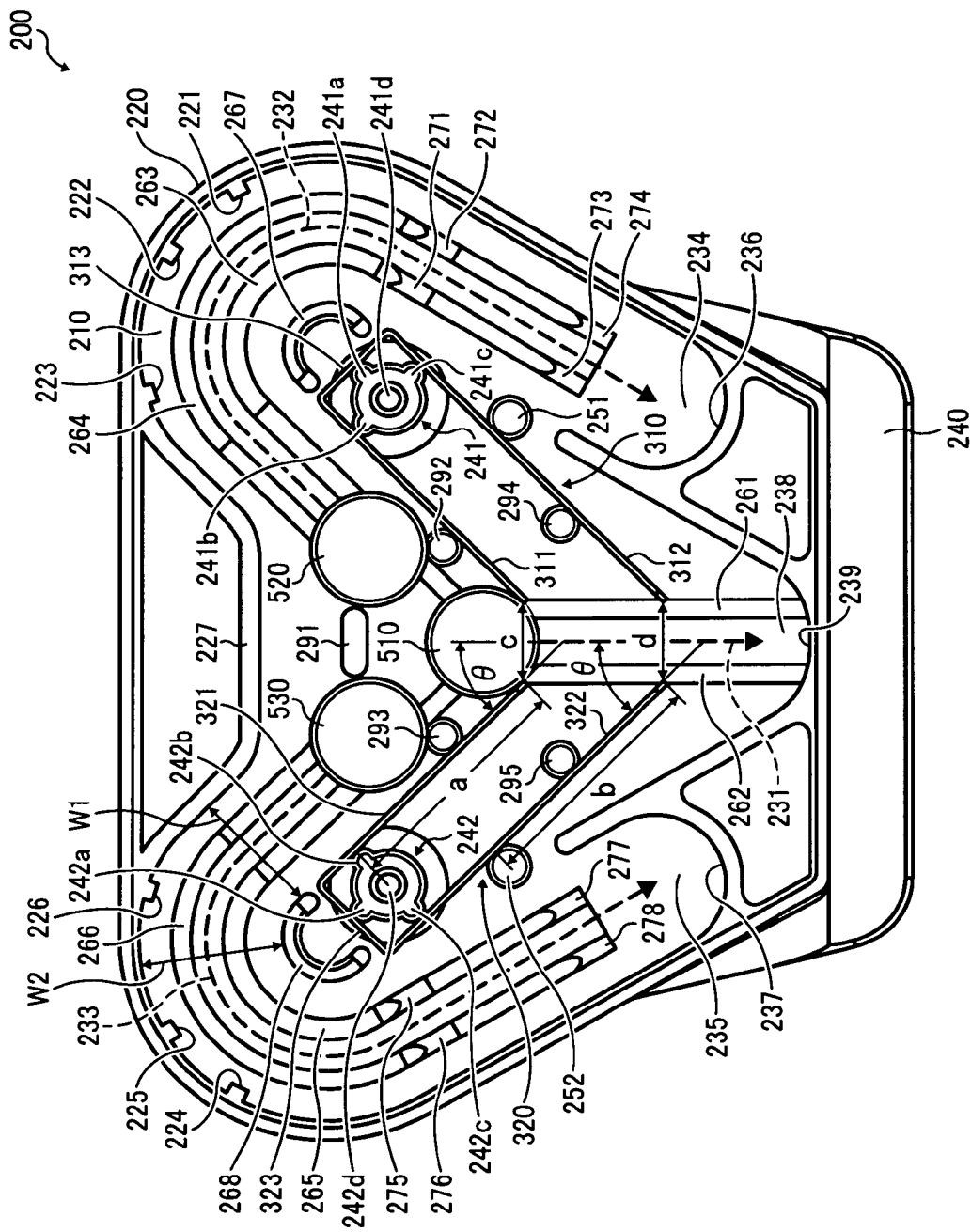
FIG. 2 is a plan view illustrating a rear case of the impact detector shown in FIG. 1.
Figure 3:
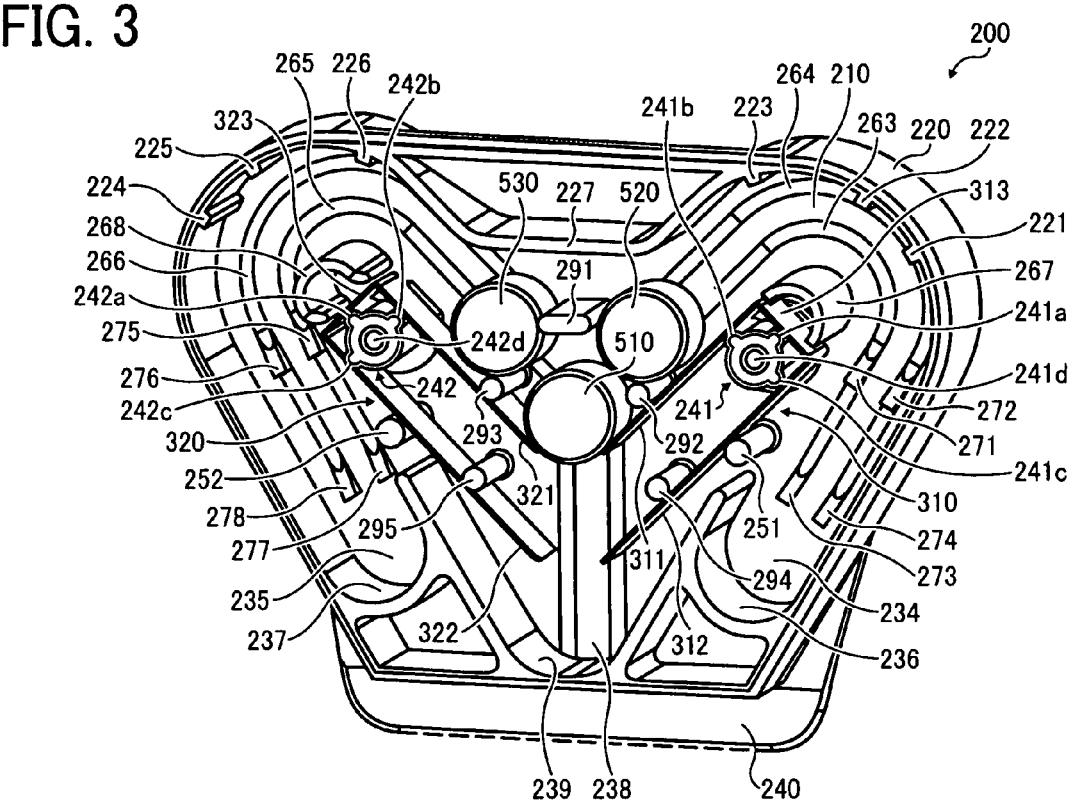
FIG. 3 is a perspective view illustrating the rear case shown in FIG. 2.
Figure 4:
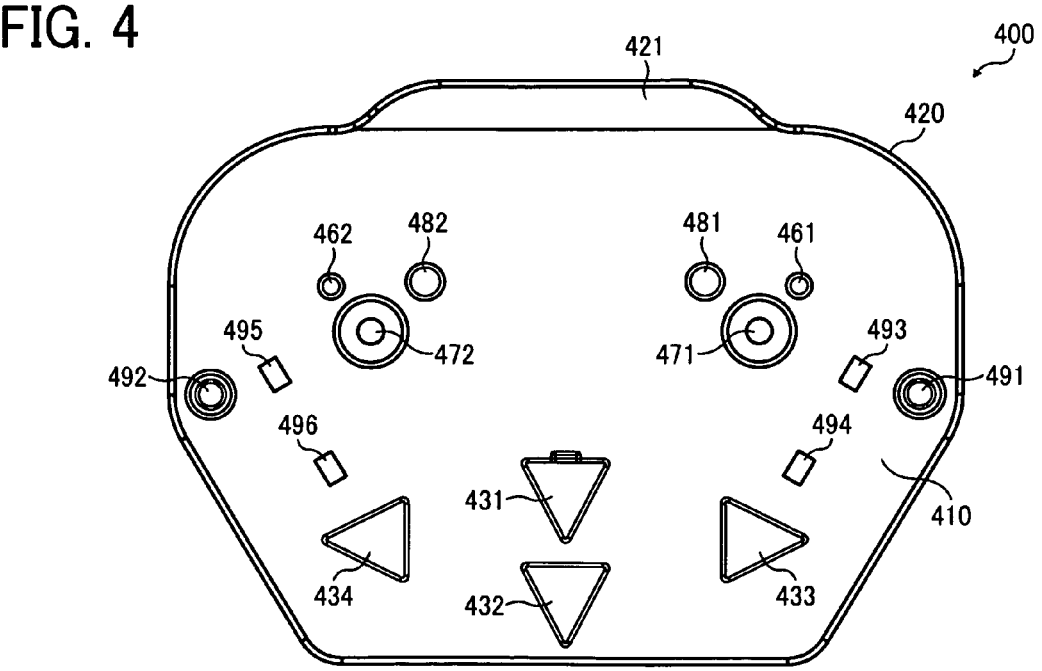
FIG. 4 is a plan view illustrating a front side (outer side) of a front case of the impact detector shown in FIG. 1.
Figure 5:
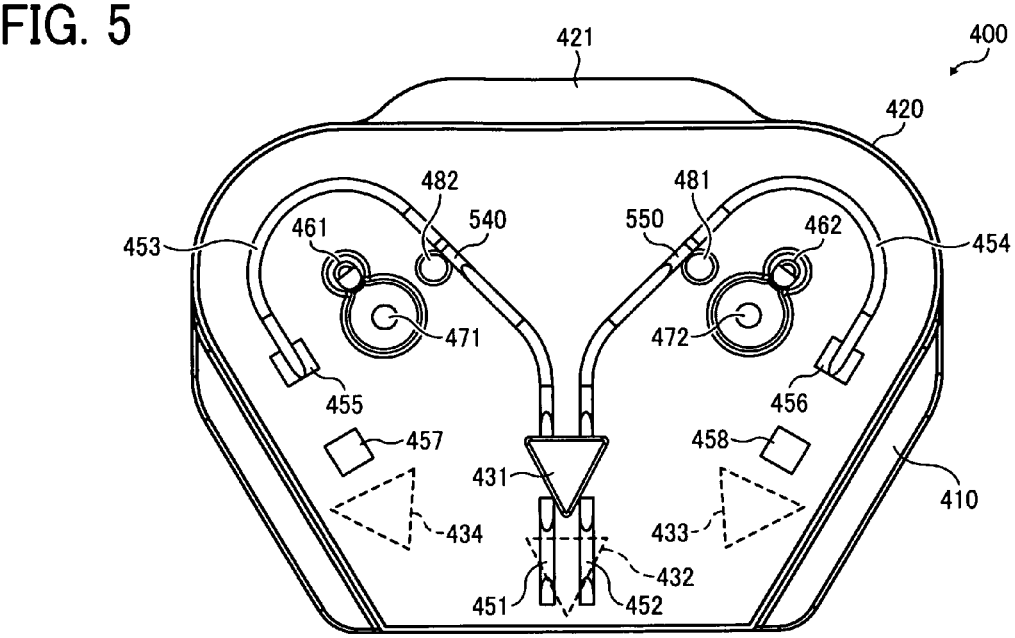
FIG. 5 is a plan view illustrating a back side (inner side) of the front case shown in FIG. 4.

FIG. 1 is an exploded perspective view illustrating an impact detector according to a first embodiment, and FIGS. 2 and 3 are respectively a plan view and a perspective view illustrating a rear case of the impact detector. FIGS. 4 and 5 are plan views respectively illustrating a front side (outer side) and a back side (inner side) of a front case of the impact detector.

Referring to FIG. 1, an impact detector 100 according to the first embodiment includes a rear case 200 and a front case 400 for covering a front side of the rear case 400; together forming a case that contains three weight, namely, a first weight 510, a second weight 520, and a third weight 530. The impact detector 100 detects vertical impact and displays history (record) of the vertical impact with the movement of the first weight 510. Further, the impact detector 100 detects rightward and left ward tilts or falls from an initial position (standing state) shown in FIG. 1 and displays history of the rightward and leftward tilts with the movement of the second weight 520 and the third weight 530, respectively. Thus, the impact detector 100 displays the history of drops, tilts, and falls of a packaging container (e.g., a cardboard box) that contains a fragile article such as an image forming apparatus to which the impact detector 100 is attached.

In the present embodiment, the first weight 510 is held by a right planar member 310 and a left planar member 320 (i.e., elastic planar members) and can detect impact from below, (drop impact) twice. The right planar member 310 is a single member including a first holding member 311 (first arm) positioned on an upper side and a second holding member 312 (second arm) positioned on a lower side, which are connected together by a folded portion 313. Similarly, the left planar member 320 is a single member including a first holding member 321 (first arm) positioned on an upper side and a second holding member 322 (second arm) positioned on a lower side, which are connected together by a folded portion 323. In the present embodiment, each of the right planar member 310 and the left planar member 320 is a single elastic thin plate made of stainless steel, for example, and is lateral U-shaped substantially.

At an initial position in a vertical transition path 231 (represented by broken arrow shown in a center lower portion in FIG. 2), the first weight 510 is supported on both sides by the first holding member 311 of the right planar member 310 and the first holding member 321 of the left planar member 320. With the first drop impact, the first weight 510 pushes the first holding members 311 and 321 away from each other, drops, and then is held by the second holding members 312 and 322. With the second drop impact, the first weight 510 pushes the second holding members 312 and 322 away from each other and then drops.

Further, with a tilt of the impact detector 100 to the right (rightward tile), the second weight 520 rolls to the right on the upper side of the first holding member 311. With a tilt of the impact detector 100 to the left (leftward tile), the third weight 530 rolls to the left on the upper side of the first holding member 321. With the above-described configuration, the impact detector 100 detects drop and displays it with the movement of the first weight 510, detects a rightward tilt and displays it with the movement of the second weight 520, and detects a leftward tilt and displays it with the movement of the third weight 530. In the present embodiment, the weights 510, 520, and 530 are circular plates like coins, each having a circumferential surface and two flat side surfaces, that is, substantially round and flat. The weights 510, 520, and 530 include metal have certain degree of weights.

The other components of the impact detector 100 will now be described below.

Referring to FIGS. 2 and 3, the rear case 200 can be made of a synthetic resin and includes a back plate 210 and a wall portion 220 standing vertically to the back plate 210 along the circumference of the back plate 210. The rear case 200 further includes, in addition to the vertically extending vertical transition path 231 through which the first weight 510 moves upon a drop impact, a curved right transition path 232 (represented by broken arrow shown on the right in FIG. 2) through which the second weight 520 moves and a curved left transition path 233 through which the third weight 530 moves (represented by broken arrow shown on the left in FIG. 2) disposed on both sides of the vertical transition path 231. The second and third weights 520 and 530 roll on the upper side of the first holding members 311 and 321, respectively, when moving through the right and left transition paths 232 and 233, and thus the right and left transition paths 232 and 233 include wall portions with which the weights 520 and 530 are in contact while moving through the right and left transition paths 232 and 233, respectively.

A right weight holding portion 234, a left weight holding portion 235, and a lower weight holding portion 238 are formed below the right transition path 232, the left transition path 233, and the vertical transition path 231, respectively. The right weight holding portion 234, the left weight holding portion 235, and the lower weight holding portion 238 are formed by rib members 236, 237, and 239, respectively, which stand on the back plate 210.

On the right and left of the vertical transition path 231, a first right supporting member 241 and a first left supporting member 242 having a predetermined shape and size stand on the back plate 210. The first right and left supporting members 241 and 242 serve as columnar members each having an irregular circumference. The first right supporting member 241 holds the folded portion 313 of the right planar member 310 fitted therein, and the first left supporting member 242 holds the folded portion 323 of the left planar member 320 fitted therein. Further, an arc-shaped member 267 standing on the back plate 210 is provided above the outer side of the first right supporting member 241 to fix the right planar member 310, and an arc-shaped member 268 standing on the back plate 210 is provided above the outer side of the first left supporting member 242 to fix the left planar member 320. The first right supporting member 241, the arc-shaped member 267, and a pressing member 461 provided in the front case 400 together fix the right planar member 310 to the case. Similarly, the first left supporting member 242, the arc-shaped member 268, and a pressing member 461 provided in the front case 400 together fix the left planar member 320 to the case. The arc-shaped members 267 and 268 also serve as respective inner guide portions of the right transition path 232 and the left transition path 233.

Further, a second right supporting member 251 and a second left supporting member 252 that stand on the on the back plate 210 are provided below the first right supporting member 241 and the first left supporting member 242, respectively. The second right supporting member 251 and the second left supporting member 252 are smaller in diameter than the first right supporting member 241 and the first left supporting member 242, respectively. The second right supporting member 251 and the second left supporting member 252 prevent rotation of the right planar member 310 and the left planar member 320, respectively. The second right supporting member 251 and the second left supporting member 252 also serve as respective fulcrums on which the second holding member 312 forming the lower portion of the right planar member 310 and the second holding member 322 forming the lower portion of the left planar member 320 deform elastically.

Further, two vertical weight guide rails 261 and 262 are formed on the back plate 210 along the vertical transition path 231, and the first weight 510 slides on the vertical weight guide rails 261 and 262. That is, the vertical transition path 231 includes a wall with which the weight 510 is in contact when moving through the vertical transition path 231. Thus, the first weight 510 can move through the vertical transition path 231 smoothly. Additionally, on the back plate 210, right weight guide rails 263 and 264 are formed along the right transition path 232, and left weight guide rails 265 and 266 are formed along the left transition path 233. The these weight guide rails and the back plate 210 are formed as a united single member. Further, to reduce the contact resistance between each weight guide rail and the corresponding weight, the weight guide rail is arc-shaped in a cross section on the side in contact with the weight.

Further, to prevent the reverse movement of the second and third weights 520 and 530, on the back plate 210, return prevention projections 271 and 273, 272 and 274, 275 and 277, and 276 and 278 are formed at respective two locations of the right weight guide rails 263 and 264 and the left weight guide rails 265 and 266. The rear case 200 further includes a stop plate 291 disposed in an upper portion of the rear case 200 in the drawings for preventing the first weight 510 from bouncing up, weight supporters 292 and 293 for supporting respective lower portions of the second weight 520 and the third weight 530, and positioning members 294 and 295 for regulating respective upper positions of the second holding members 312 and 322. Theses elements stand on the back plate 210. Further, the wall portion 220 includes a horizontal portion 227 positioned above the stop plate 291, in the proximity of the stop plate 291.

Figure 6:
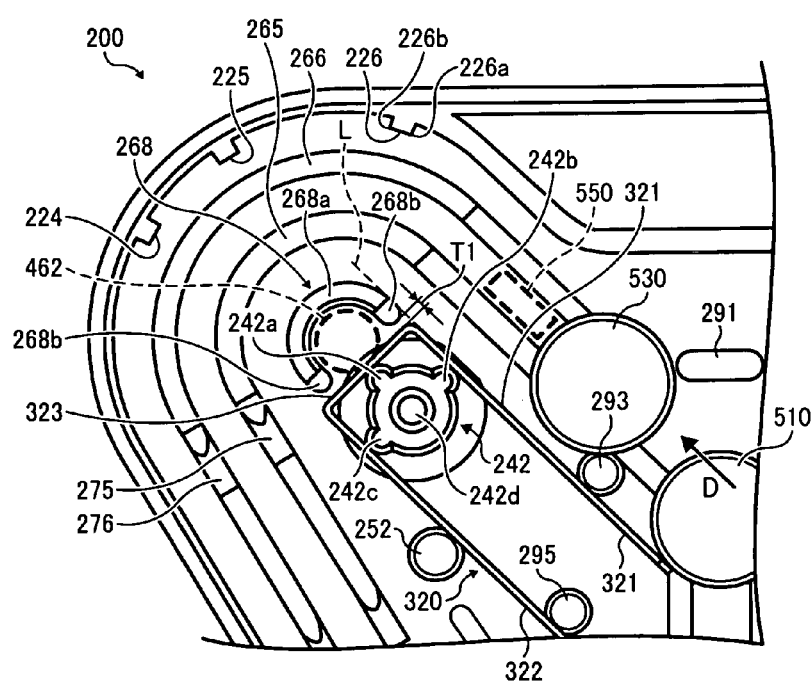
FIG. 6 is an enlarged plan view illustrating projections formed in a transition path in the rear case.
Figure 7:
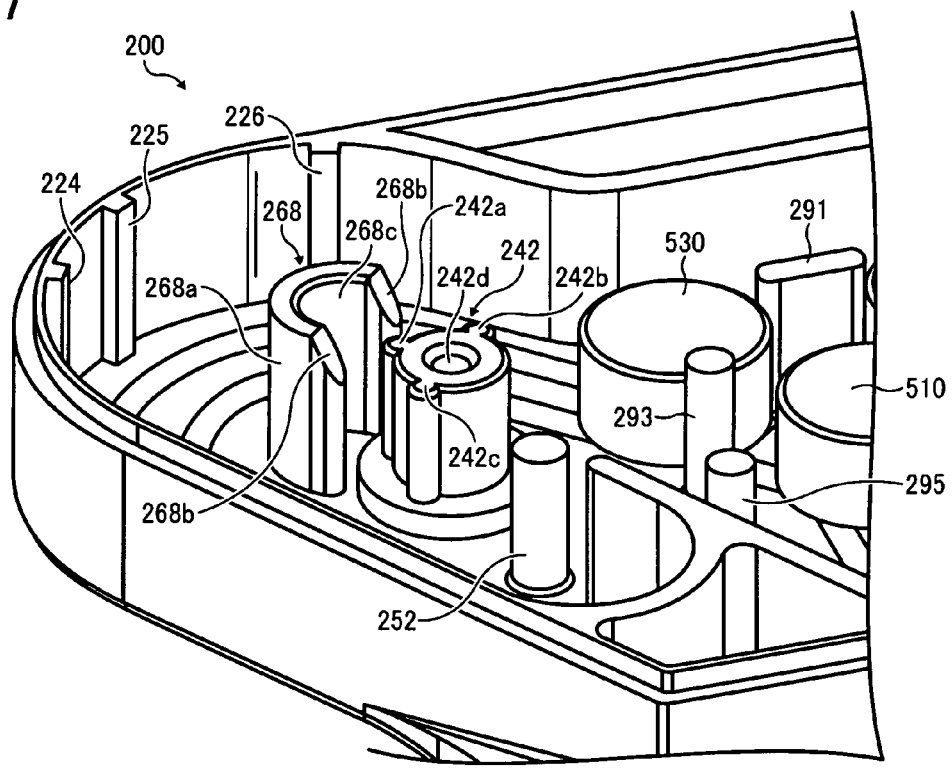
FIG. 7 is an enlarged perspective view illustrating the projections formed in the transition path in the rear case.

Next, projections formed on the wall portion 220 for preventing the second weight 520 and the third weight 530 from bouncing up are described below with reference to FIGS. 2, 6, and 7. FIGS. 6 and 7 are respectively an enlarged plan view and an enlarged perspective view illustrating projections 221, 222, 223, 224, 225, and 226 serving as restriction portions formed in the rear case.

The projections 221, 222, 223, 224, 225, and 226 project from the inner surface of the wall portion 220 and are positioned in the upper portion of the wall portion 220, above the right and left transition paths 232 and 233, to prevent the second weight 520 or the third weight 530 from bouncing up and moving. Referring to FIG. 2, the projections 221, 222, 223, 224, 225, and 226 are for narrowing a width W2, of the right and left transition paths 232 and 233. The width W2 is the length of the right and left transition paths 232 and 233 in the direction perpendicular to the thickness of the weights. In other words, the projections 221, 222, 223, 224, 225, and 226 are for reducing the distance of the gap in the interior of the rear case 200 (i.e., the gap between the wall portion 220, serving as an upper wall, and the arc-shaped member 267 or 268, serving as a lower wall) sandwiching the circumference of the second weight 520 or the third weight 530 in the direction of diameter of the second weight 520 or the third weight 530.

In the present embodiment, the width W2 of the right and left transition paths 232 and 233 in portions along the outer circumference of the arc-shaped members 267 and 268, respectively, are wider than a width W1 of the right and left transition paths 232 and 233 in entrance portions thereof, thus facilitating passage of the second and third weights 520 and 530. Additionally, the projections 221, 222, 223, 224, 225, and 226 have a substantially similar shape, and, for example, the projection 223 includes corners 226a and 226b. Other projections 221, 222, 223, 224, and 225 have corners similarly. It is to be noted that the shape of the projections 221, 222, 223, 224, 225, and 226 is not limited to the above-described shape but can be any given shape such as semicircular or shapes having irregular surfaces as long as it can reduce the width W2 of the right and left transition paths 232 and 233.

Reflex of the weights caused by the projections is described below with reference to FIG. 9 that illustrates a case in which the impact detector 100 receives an impact that causes the third weight 530 to bounce up.

Figure 9:
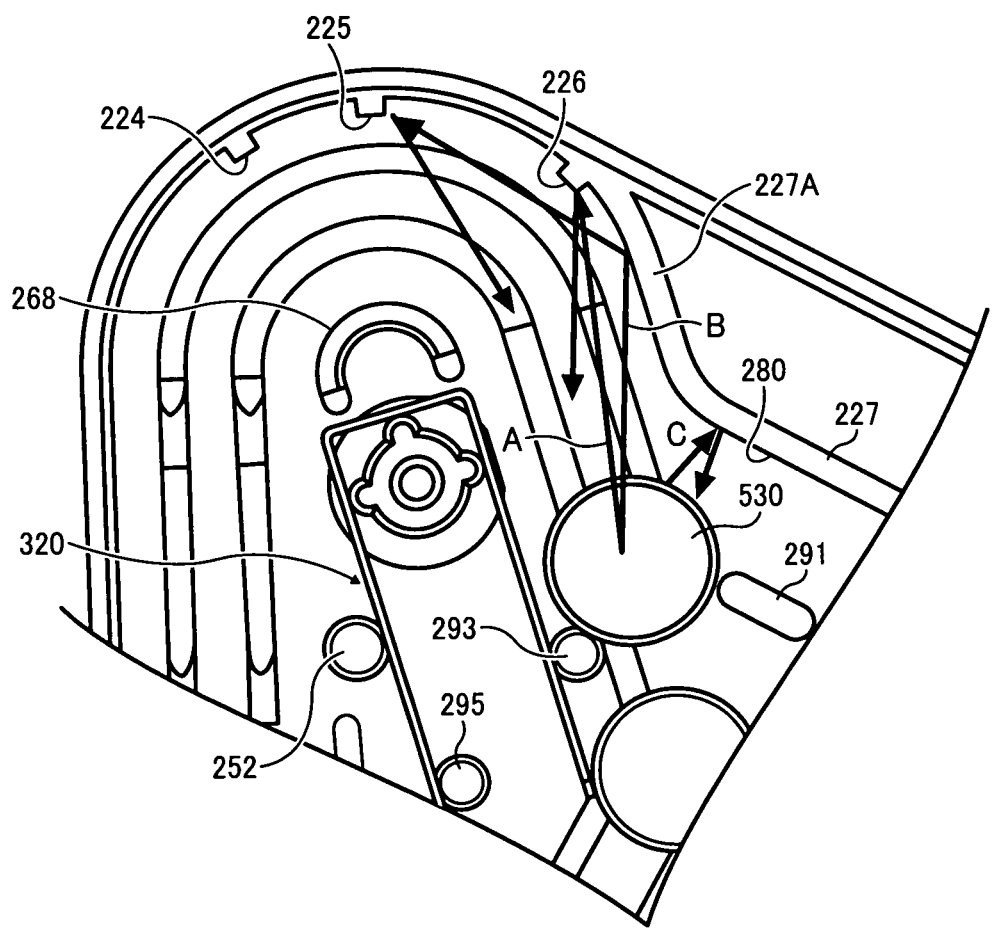
FIG. 9 is a schematic diagram illustrating reflex of a weight caused by the projections in the rear case.

It is to be noted that, in FIG. 9, reference numeral 280 represents an inner wall of the horizontal portion 227, and reference character 227A represents a guide wall that is continuous with the horizontal portion 227 and guides the third weight 530 from the initial position to the left transition path 233. The guide wall 227A is positioned upstream from the projection 226 in the direction in which the third weight 530 moves to the impact detection position when the case receives a left-side impact.

Referring to FIG. 9, when receiving such an impact, the third weight 530 bounces off the projection 226 as indicated by arrow A. Then, the third weight 530 bounces off the guide wall 227A as well as the projection 225 as indicated by arrow B, and returns to the initial position. Thus, malfunction of the impact detector 100 caused by impact in directions that are not to be detected can be prevented.

For example, the impact detector 100 receives impact in directions that are not to be detected in the following case.

In the present embodiment, when the packaging container, such as a cardboard box, to which the impact detector 100 is attached is dropped vertically, the first weight 510 moves down and thus indicates occurrence of the impact. In such vertical drop, the second and third weights 520 and 530 might receive repulsion of the weight supporters 292 and 293, respectively, and bounce up. Although the third weight 530 bounces off the inner wall 280 of the horizontal portion 227 as indicated by arrow C to the initial position in vertical drops, if the cardboard box to which the impact detector 100 is attached is dropped in a position tilted to the right in the drawings or is dropped from its lower right corner, the third weight 530 might move through the transition path identical to that for leftward tilt or fall, which is not desirable. Therefore, the projections 221 through 226 are provided for returning the second weight 520 and the third weight 530 to the respective initial positions. Thus, detecting impact in directions not to be detected, that is, malfunction of the impact detector 100, can be prevented in the present embodiment.

The rear case 200 further includes a flange portion 240 extending downward, to be attached to a packaging container. The flange portion 240 is formed as an extension of the back plate 210. As described above; the rear case 200 has a line-symmetric structure with respect to the vertical transition path 231.

Next, the front case 400 will be described below with reference to FIGS. 1, 4, and 5. FIGS. 4 and 5 are plan views that illustrate a front side (outer side) and a back side (inner side) of the front case 400.

The front case 400 can be made of a transparent or semi-transparent synthetic resin. As illustrated in FIGS. 4 and 5, the front case 400 includes a planar body 410 for covering the front side of the rear case 200 entirely and a wall portion 420 for alignment that is formed around a circumference of the planar body 410. Further, display windows for checking the position of the first to third weights 510 to 530 are formed in the planar body 410. Namely, the front case 400 includes a first display window 431 for displaying detection of the first drop, a second display window 432 for displaying detection of the second drop, a third display window 433 for displaying detection of rightward tilt, and a fourth display window 434 for displaying detection of leftward tilt. The first display window 431 is formed at a position corresponding to the first weight 510 held by the second holding members 312 and 322. The second display window 432 is formed at a position corresponding to the lower weight holding portion 238. The third display window 433 is formed at a position corresponding to the right weight holding portion 234. The fourth display window 434 is formed at a position corresponding to the left weight holding portion 235. In the present embodiment, the first display window 431 is a triangular hole. Although triangular as well, the second, third, and fourth display windows 432, 433, and 434 are not holes but are thinner portions, thinner than the other area of the planar body 410, with a polished surface to allow users to observe inside the case visually.

Further, on a surface of the planar body 410 on the side (inner side) facing the rear case 200, two vertical weight guide rails 451 and 452 corresponding to the vertical transition path 231, a right weight guide rail 453 corresponding to the right transition path 232, and a left weight guide rail 454 corresponding to the left transition path 233 are formed. Each of the weight guide rails 451 to 454 and the planar body 410 are formed as a single unit. To reduce the contact resistance between the weight guide rail and the corresponding weight, the weight guide rail is arc-shaped in a cross section on the side in contact with the weight. Further, to prevent the reverse movement of the second and third weights 520 and 530, the right and left weight guide rails 453 and 454 include return prevention projections 455 and 457, and return prevention projections 456 and 458, respectively. The return prevention projections 455, 457, 456, and 458 are respectively disposed corresponding to the return prevention projections 271, 272, 273, 274, 275, 276, 277, and 278 formed on the rear case 200.

Next, a configuration in the front case 400 for preventing the weights from moving in impact in directions not to be detected is described below.

Figure 8:
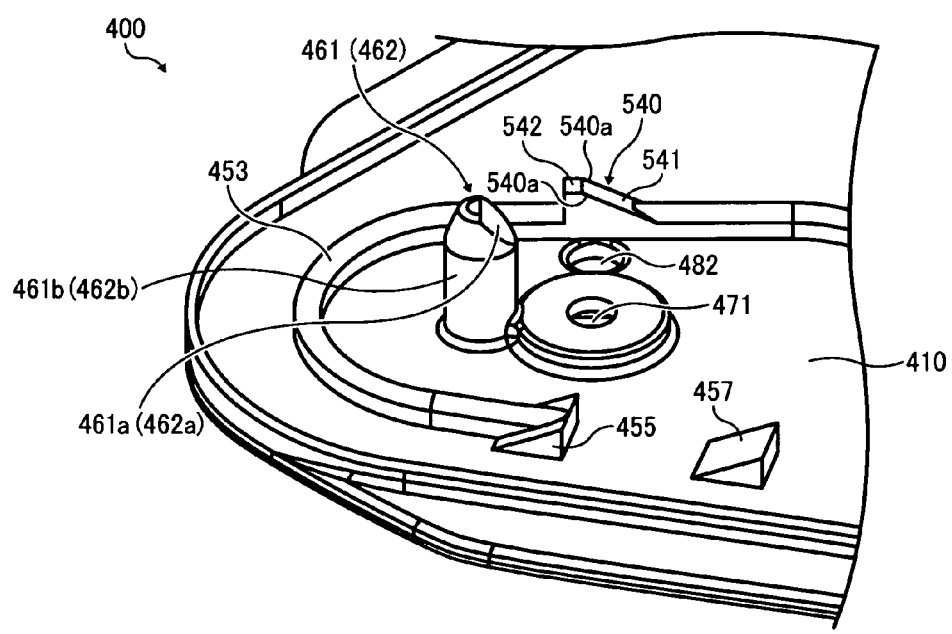
FIG. 8 is an enlarged perspective view illustrating a pawl formed in the front case.

FIG. 8 is an enlarged perspective view illustrating pawls 540 and 550 that serve as restriction portions formed in the front case 400. It is to be noted that, because the pawls 540 and 550 are symmetrical, FIG. 8 illustrates only the vicinity of the pawl 540.

Referring to FIGS. 1 and 5, the weight guide rails 453 and 454 respectively include pawls 540 and 550, serving as restricting portions, and the pawls 540 and 550 are positioned in the vicinity of the initial positions of the second weight 520 and the third weight 530, respectively.

The pawls 540 and 550 are provided in one of the rear case 200 and the front case 400 that sandwich therebetween the second and third weights 520 and 530 in the thickness direction of the second and third weights 520 and 530, thereby together forming the right transition path 232 and the left transition path 233. It is to be noted that, although the pawls 540 and 550 are provided in the front case 400 in the present embodiment, the pawls 540 and 550 may be provided in the rear case 200 instead of the front case 400. The pawls 540 and 550 respectively allow the second and third weights 520 and 530 to move only when the impact detector 100 falls in the direction to be detected and inhibit movement of the second and third weights 520 and 530 when the impact detector 100 falls in directions not to be detected. The back plate 210 of the rear case 200 and the guide rails 453 and 454 (planar body 410) of the front case 400 serve as opposing walls sandwiching therebetween the weights, on one of which the pawls 540 and 550 are provided.

In other words, the pawls 540 and 550 respectively allow the second and third weights 520 and 530 to move only when the second and third weights receive force in the direction to be detected and inhibit movement of the second and third weights 520 and 530 when the second and third weights 520 and 530 receive force in directions not to be detected.

The pawls 540 and 550 are provided in the transition paths at positions corresponding to the initial positions of the second and third weights 520 and 530, respectively. Herein, the initial positions of the second and third weights 520 and 530 mean positions thereof before the impact detector 100 detects an impact, and, as shown in FIG. 6, the third weight 530 at the initial position is in contact with the weight supporter 293 as well as the stop plate 291. Similarly, although not shown in FIG. 6, the second weight 520 at the initial position is in contact with the weight supporter 292 as well as the stop plate 291.

Referring to FIG. 8, in the present embodiment, the pawl 540 includes a sloped surface 541 and a flat surface 542. The sloped surface 541 is sloped to increase the an amount of projection from the planer body 410 (i.e., height of the pawl 540) toward downstream in the direction in which the weight 520 moves when detecting rightward tilt, and the flat surface 542 is continuous with the upper end of the sloped surface 541. In other words, the sloped surface 541 is sloped in a direction to reduce the right transition path 233 in size in the direction of thickness of the weight 520 toward downstream in a weight transition direction in which the weight 520 moves when the case receives the impact in the predetermined direction (i.e., to the right in FIG. 1). Similarly, the pawl 550 includes a sloped surface 541 and a flat surface 542 although not shown. The sloped surfaces 541 and 551 of the pawls 540 and 550 are configured to facilitate movement of the second weight 520 and the third weight 530, respectively, in lateral fall of the packaged article to be detected. The sloped surface 541 and the flat surface 542 of the pawl 540 together form a corner 540a therebetween. Similarly, the sloped surface 551 and the flat surface 552 of the pawl 550 together form a corner 550a therebetween although not shown in the drawings. Additionally, referring to FIG. 10A, the amount of projection of the pawls 540 and 550 at the corners 540a and 550a, that is, a downstream portion of the pawls 540 and 550 in the weight transition direction, is set so that a height h. That is, the right transition path 232 and the left transition path 233 are only slightly greater in the direction of thickness of the weights 520 and 530 than the thickness H of the weights 520 and 530.

Figure 10A:
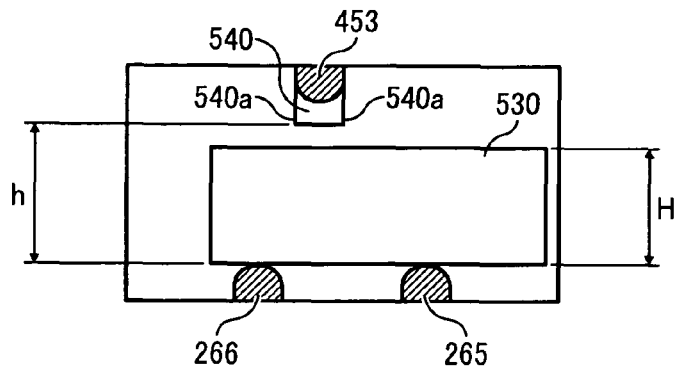
FIGS. 10A through 10C are schematic diagrams illustrating the pawl viewed in the direction indicated by arrow D shown in FIG. 6.
Figure 10B:
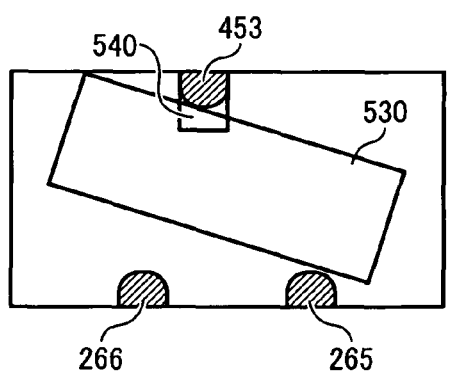
Figure 10C:
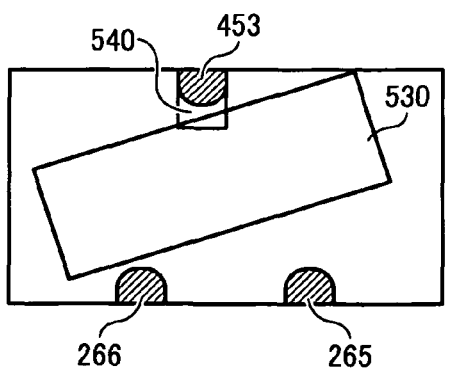

FIGS. 10A through 10C are schematic diagrams illustrating the pawl 540 viewed in the direction indicated by arrow D shown in FIG. 6.

In the present embodiment, when the packaged article falls to the front side, that is, to the side of the front case 400, although the second and third weights 520 and 530 are about to move, a force in a direction perpendicular to the transition paths (planer body 410 shown in FIG. 8) acts on the second and third weighs 520 and 530, causing the second and third weighs 520 and 530 to jolt or vibrate as shown in FIGS. 10B and 10C. Then, the second and third weights 520 and 530 respectively contact the sloped surfaces 541 and 551 or the corners 540a and 550a of the pawls 540 and 550 and are prevented from moving further along the right transition path 232 and the left transition path 233. Thus, malfunction of the impact detector 100 (erroneous detection) can be prevented. By contrast, when the packaged article falls in the direction to be detected, the second and third weights 520 and 530 are respectively kept in contact with the first holding members 311 and 321 while moving, guided by the sloped surfaces 541 and 551 of the pawls 540 and 550. Thus, the second and third weights 520 and 530 respectively move through the right transition path 232 and the left transition path 233.

The second and third weights 520 and 530 respectively tend to engage the corners 540a and 550a of the pawls 540 and 550 and can be stopped easily. Additionally, when the second and third weights 520 and 530 contact the flat surfaces 542 and 552, respectively, contact resistance therebetween inhibits movement of the second and third weights 520 and 530. The flat surfaces 542 and 552 may be substantially in parallel to the guide rail 453 or the planar body 410. Thus, the movement of the second and third weights 520 and 530 can be restricted effectively.

Upon impact in the direction to be detected, the second weight 520 can slide between the weight guide rail 453 (shown in FIG. 5) formed in the front case 400 and the right weight guide rails 263 and 264 formed in the rear case 200, guided by the sloped surface 541 of the pawl 540. Similarly, upon the direction to be detected, the third weight 530 can slide between the weight guide rail 454 (shown in FIG. 5) formed in the front case 400 and the left weight guide rails 265 and 266 formed in the rear case 200, guided by the sloped surface 551 of the pawl 550.

In the present embodiment, the pawls 540 and 550 are positioned close to the initial positions of the second weight 520 and the third weight 530, respectively. If the pawls 540 and 550 are positioned away from the initial positions of the second weight 520 and the third weight 530, respectively, oscillation of the second weight 520 and the third weight 530 in the transition paths can converge. In such a state, it is possible that the second weight 520 and the third weight 530 overstride the sloped surfaces 541 and 551 of the pawls 540 and 550, resulting in erroneous detection, that is, malfunction of the impact detector 100. Therefore, such an arrangement is not desirable.

Table 1 shows result of an experiment that was performed to check occurrence of erroneous detection in two types of impact detectors attached to a cardboard box when the cardboard box fell in the detection to be detected and is dropped. Type 1 has the configuration of the present embodiment in which the pawls 540 and 550 (hereinafter "lower pawls") are respectively provided close to the initial positions of the second and third weights 520 and 530, and type 2 is a comparative example that includes pawls (hereinafter "upper pawls") respectively disposed at upper positions away from the initial positions of the second and third weights 520 and 530.

The experiment was performed a dozen times, and "Bad" and "Good" were marked in table 1 when erroneous detection occurred and when erroneous detection did not occur, respectively.

TABLE 1

|  | Type 1 (Lower pawls) | | Type 2 (Upper pawls) | |
| --- | --- | --- | --- | --- |
|  | Left | Right | Left | Right |
| 1 | Good | Good | Good | Good |
| 2 | Good | Good | Good | Good |
| 3 | Good | Good | Good | Good |
| 4 | Good | Good | Good | Good |
| 5 | Good | Good | Good | Good |
| 6 | Good | Good | Good | Good |
| 7 | Good | Good | Good | Good |
| 8 | Good | Good | Good | Good |
| 9 | Good | Good | Good | Good |
| 10 | Good | Good | Good | Good |
| 11 | Good | Good | Good | Good |
| 12 | Good | Good | Bad | Bad |

As shown in table 1, in type 1 that includes the lower pawls respectively positioned close to the initial positions of the second and third weights 520 and 530, the second and third weights 520 and 530 respectively disposed on the right and the left did not detect impact erroneously. By contrast, in type 2 that includes the upper pawls respectively positioned away from the initial positions of the second and third weights 520 and 530, erroneous detection occurred. From the results of the experiments, it is confirmed that disposing the pawls 540 and 550 closer to the second and third weights 520 and 530, respectively, is effective.

As described above, the closer the pawls 540 and 550 to the initial positions of the second and third weights 520 and 530, respectively, the more easily the vibrating second and third weights 520 and 530 contact the pawls 540 and 550, respectively, thus attaching higher effects. However, if the pawls 540 and 550 are respectively so close to the initial positions of the second and third weights 520 and 530 that the sloped surfaces 541 and 551 of the pawls 540 and 550 respectively overlap the second and third weights 520 and 530 at the initial positions, the second and third weights 520 and 530 might move along the sloped surfaces 541 and 551 when the cardboard box falls to the side of the front case 400. For this reason, it is preferred that the inclination of the sloped surfaces 541 and 551 be relatively great so that the pawls 540 and 550 can be disposed close to the respective initial positions of the second and third weights 520 and 530 while avoiding the overlap between the pawls 540 and 550 and the second and third weights 520 and 530. However, if the inclination is extremely great, it is possible that the sloped surfaces 541 and 551 might obstruct rolling of the second and third weights 520 and 530 when the cardboard box falls in the direction to be detected, thus hindering proper impact detection. In view of the foregoing, it is preferable that the pawls 540 550 have a length similar to the radius of the weights, for example.

Additionally, the planar body 410 includes cylindrical pressing members 461 and 462 to be fit in the arc-shaped members 267 and 268 formed on the back plate 210 of the rear case 200, respectively. When the front case 400 is attached to the rear case 200, the pressing members 461 and 462 are inserted in the arc-shaped members 267 and 268, respectively. Thereby, the right planar member 310 supported by the first right supporting member 241 and the left planar member 320 supported by the first left supporting member 242 are fixed with their end portions for holding the weight 510 positioned lower than a center portion of the rear case 200. Herein, referring to FIGS. 5 and 8, the pressing members 461 and 462 respectively include tilted portions 461a and 462a although FIG. 8 illustrates only a right portion of the front case 400, with the pressing members 461 omitted. Thereby, the assembling accuracy of the front case 400 and the rear case 200 with the right and left planar members 310 and 320 attached thereto can be improved.

Further, as illustrated in FIG. 4, screw holes 471 and 472 are formed in the planar body 410 of the front case 400 for screws for fixing the front case 400 to the rear case 200. Further, insertion holes 481 and 482 are formed in the planar body 410 of the front case 400 for a fixing member for fixing the first to third weights 510 to 530. For example, the weight fixing member is a metal wire bent to have three leg portions. When the impact detector 100 is not used, the leg portions are inserted in the first display window 431 and the insertion holes 481 and 482 and placed in contact with a lower portion of the first weight 510 and respective upper portions of the second and third weights 520 and 530. Thereby, the first to third weights 510 to 530 are fixed, and thus the impact detector 100 is inactivated (a non-detection state). Additionally, holes 491 and 492 are formed in the planar body 410 for aligning a sealing member 740 described later (see FIG. 12A), and recessed portions 493, 494, 495, and 496 for preventing sink marks caused by the return prevention projections 455, 457, 456, and 458 in the production of the front case 400.

Next, a detailed structure of the rear case 200 will be described on the basis of FIGS. 6 and 7. The rear case 200 of the impact detector 100 according to the present embodiment has a bilaterally symmetric shape. Therefore, FIGS. 6 and 7 illustrate only a left part of the rear case 200 for simplicity. Screw holes 241d and 242d are respectively formed in center portions of the first right supporting member 241 and the first left supporting member 242 to screw the front case 400 to the rear case 200. The screw hole 241 is surrounded by a small cylindrical screw fixing boss. Further, the first right supporting member 241 includes a sandwiching projection 241a and contact projections 241b and 241c, each of which has a semicircular cross section and projects from the circumference of the screw fixing boss. The sandwiching projection 241a of the first right supporting member 241 and the pressing member 461 formed in the front case 400 together fix the second end portion of the planar elastic member (right planar member 310). Similarly, the first left supporting member 242 includes a sandwiching projection 242a and contact projections 242b and 242c, each of which has a semicircular cross section and projects from the circumference of a small cylindrical screw fixing boss surrounding the screw hole 242d. The sandwiching projection 242a of the first right supporting member 242 and the pressing member 462 formed in the front case 400 together fix the second end portion of the planar elastic member (left planar member 320). With this reduction in diameter of the first right supporting member 241 and the first left supporting member 242 serving as the screw fixing bosses, the torque required to tighten the screws can be reduced. Accordingly, poor screw tightening can be prevented or reduced, and the assembling work efficiency can be improved.

Additionally, the arc-shaped members 268 and 267 respectively include guide surfaces 268a and 267a, formed on respective outer circumferences thereof to guide the third weight 530 and the second weight 520, and guide surfaces 268c (shown in FIG. 9) and 267c formed on respective inner circumferences thereof to guide the pressing members 462 and 461, respectively. Moreover, the arc-shaped members 268 and 267 include tilted surfaces 268b and 267b, respectively. The tilted surfaces 268b and 267b respectively facilitate insertion of the left planar member 320 between the first left supporting member 242 and the arc-shaped member 268 and insertion of the right planar member 310 between the first right supporting member 241 and the arc-shaped member 267 when the left and right planar members 320 and 310 are attached to the rear case 200. Herein, referring to FIG. 6, an end portion of the arc-shaped member 268 do not project from an extension line (a broken line L in FIG. 8) of the first holding member 321. Similarly, an end portion of the arc-shaped member 267 does not project from an extension line of the first holding member 311 although not shown in FIG. 6. With this configuration, a gap T1 between the arc-shaped member 268 and the first holding member 321 of the left planar member 320 is smaller than the diameter of the third weight 530. Thereby, the third weight 530 is prevented from being caught by the gap T1 when moving to the upper-left in FIG. 6 from the first holding member 321 to the end portion of the arc-shaped member 268.

Next, the right and left planar members 310 and 320 will be described below.

In the present embodiment, the right planar member 310 is constructed of a thin stainless steel plate having a width of, for example, approximately 6 mm and a thickness of for example, approximately 0.3 mm, and is bent at both ends of the folded portion 313, thereby forming the first holding member 311 (arm portion) and the second holding member 312 (arm portion) with an upper portion and a lower portion of the plate, respectively. Similarly, the left planar member 320 is constructed of a thin stainless steel plate having a width of approximately 6 mm and a thickness of approximately 0.3 mm, for example, and is bent at both ends of the folded portion 323, thereby forming the first holding member 321 (arm portion) and the second holding member 322 (arm portion) with an upper portion and a lower portion of the plate, respectively. In the configuration shown in FIGS. 6 and 7, the second end portions of the right planar member 310 and the left planar member 320 are clamped with the folded portions 313 and 323 in contact with the sandwiching projection 241a of the first supporting member 241 and a sandwiching projection 242a of the first supporting member 242, respectively, and then the pressing members 461 and 462 of the front case 400 are inserted in and pressed by the arc-shaped members 267 and 268, respectively. Further, the first holding members 311 and 321 are in contact with and fixed by the contact projections 241b and 242b, respectively, and the second holding members 312 and 322 are in contact with and fixed by the contact projections 241c and 242c, respectively. It is to be noted that, the right and left planar members 310 and 320 may be formed of phosphor bronze when minor adjustment of the resilience force of the right and left planar members 310 and 320 is required. Alternatively, the right and left planar members 310 and 320 may be made of a resin such as nylon if it is necessary to prevent the formation of rust for long-term storage reliably.

As illustrated in FIG. 6, when the left planar member 320 is attached to the rear case 200, the folded portion 323 is in contact with and held by the sandwiching projection 242a, and the first holding member 321 and the second holding member 322 are in contact with and held by the contact projections 242b and 242c, respectively. When the front case 400 is attached to the rear case 200 in this state, the pressing member 462 of the front case 400 is inserted in the arc-shaped member 268 and in contact with the folded portion 323. Thereby, the folded portion 323 is sandwiched and fixed by the pressing member 462 and the sandwiching projection 242a. It is to be noted that, in consideration of the tolerances of the components and the arrangement in which the sandwiching projection 242a and the pressing member 462 are provided to different members, the sandwiching projection 242a and the pressing member 462 can have dimensional errors. Therefore, it is possible that the pressing member 462, the sandwiching projection 242a, and the folded portion 323 are not in close contact with one another practically in some cases. However, because the first holding member 321 and the second holding member 322 of the left planar member 320 are in contact with the contact projections 242b and 242c, respectively, the left planar member 320 can be held reliably in the rear case 200. In this specification, the state in which "the right and left planar members 310 and 320 are clamped" includes a state in which the components are not fully in contact with one another due to slight gaps formed therebetween as in the description above.

Herein, when the front case 400 is attached to the rear case 200 by sliding the pressing member 462 along the guide surface 268c of the arc-shaped member 268, if the position of the folded portion 323 is shifted to the arc-shaped member 268, the folded portion 323 and the pressing member 462 interfere with each other, and thus the front case 400 cannot be attached to the rear case 200.

Therefore, in the present embodiment, the tilted portion 462a is formed in the edge portion of the pressing member 462 on the side facing the folded portion 323. Even if the folded portion 323 is shifted to the arc-shaped member 268, the folded portion 323 can be guided along the tilted portion 462a, after which the position of the pressing member 462 on the side of the arc-shaped member 268 is regulated by the guide surface 268c.

Then, the folded portion 323 is moved to the sandwiching projection 242a by a cylindrical portion 462b of the pressing member 462 disposed beneath the tilted portion 462a in FIG. 8. Therefore, the folded portion 323 can be sandwiched by the cylindrical portion 462b of the pressing member 462 and the sandwiching projection 242a.

Next, description will be made of the state of the left planar members 310 and 320 when the impact detector 100 receives a vertical impact.

When the impact detector 100 receives a vertical impact, the first weight 510 is disengaged from the first holding member 321 and moves downward. More specifically, the first weight 510 moves while pushing downward end portions (i.e., a points of action) of the first holding members 311 and 321 of the right and left planar members 310 and 320 in contact with the first weight 510. In this process, because each of the right and left planar members 310 and 320 is held at three points, a center portion of each of the folded portions 313 and 323 is not deformed, but the first holding members 311 and 321 deform at positions in contact with the contact projection 241b and 242b serving as fulcrums. Accordingly, the detection accuracy can be improved. Additionally, in the present embodiment, the entirety left planar member 320 is formed into a substantially angled U-shape, and the folded portion 323 is not curved but is linear. With the left planar member 320 that is substantially angled U-shaped, the distance of the gap T1 (shown in FIG. 6) between the end portion of the arc-shaped member 268 and the folded point between the first holding member 321 and the folded portion 323 can be reduced. The right planar member 310 is configured similarly. As a result, the third weight 530 can move smoothly without being caught in the gap between the first holding member 321 and the arc-shaped member 268.

As illustrated in FIG. 2, the first holding member 311 of the right planar member 310 attached to the rear case 200 has an effective spring length (indicated by double-headed arrow a shown in FIG. 2, hereinafter "effective spring length a") that extends from a point of contact between the first holding member 311 and the first supporting member 241 to a lower end of the first holding member 311. Similarly, an effective spring length of the first holding member 321 extends from a point of contact between the first holding member 321 and the first supporting member 242 to a lower end of the first holding member 321. Further, an effective spring length (indicated by double-headed arrow b shown in FIG. 2, hereinafter "effective spring length b") of the second holding member 312 extends from a point of contact between the second holding member 312 and the second supporting member 251 to a lower end of the second holding member 312. Similarly, an effective spring length of the second holding member 322 extends from a point of contact between the second holding member 322 and the second supporting member 252 to a lower end of the second holding member 322. In the present embodiment, the effective spring lengths a and b are identical or similar and approximately 20 mm, for example. Additionally, in the present embodiment, a gap between the first holding members 311 and 321 (indicated by double-headed arrow c shown in FIG. 2, hereinafter "gap c") and a gap between the second holding members 312 and 322 (indicated by double-headed arrow d shown in FIG. 2, hereinafter "gap d") are identical or similar. Therefore, two impacts of the same magnitude can be detected with the use of the same first weight 510.

Further, in the present embodiment, each of the first holding members 311 and 321 and the second holding members 312 and 322 forms an angle θ, which is smaller than 90 degrees, with the vertical transition path 231. The angle θ may be 45 degrees, for example. As described above, the first holding members 312 and 322 on the upper side serve as the lower guide member for guiding the second weight 520 moving through the right transition path 232 and the lower guide member for guiding the third weight 530 moving through the left transition path 233, respectively. Therefore, a threshold of angle of tilt is set with the above-described angle θ. Herein, the angle θ affects the sensitivity level of the impact detection using the first weight 510 in addition to determining the threshold angle of tilt to be detected. In the present embodiment, the angle θ is set to 45 degrees, considering that the packaging container, to which the impact detector 100 is attached, is rectangular parallelepiped generally.

The magnitude of drop impact to be detected and the accuracy thereof are determined by factors including, in addition to the above-described angle θ, a variety of characteristics of the planar members 310 and 320, such as the material, the cross-sectional shape, the effective spring lengths a and b, the distance of the gap c between the end portions of the first holding members 311 and 321, and the distance of the gap d between the end portions of the second holding members 312 and 322, and the mass and the diameter of the first weight 510. In the present embodiment, the values of these factors are set on the assumption that the impact detector 100 is used for relatively large packaging containers. In general, impact detectors for relatively large packaging containers are generally intended to detect a drop from a relatively low position rather than a drop from a relatively high position. If the mass of the weight 510 is relatively small, it is difficult to detect impact of drop from a relatively low position unless the spring force of the first and second holding members 311, 321, 312, and 322 is substantially reduced. To detect the drop impact from a relatively low position by using relatively light weights, holding members having relatively small spring force are required. In this case, the detection accuracy is deteriorated. The fluctuation in the detection accuracy can be caused by friction or engagement between the weight 510 and the first and second holding members 311, 321, 312, and 322, deformation of the folded portions 313 and 323, and the like.

In view of the above, the present embodiment uses a weight having a certain amount of mass as the weight 510. For example, in the present embodiment, the weight 510 is a tablet-like stainless steel weight having a circular periphery, a diameter of approximately 10 mm, a thickness of approximately 6 mm, and a mass of approximately 3.7 g. Preferably, the weight 510 is chamfered to prevent the friction and engagement with the first and second holding members 311, 321, 312, and 322. The outer surface of the weight 510 may exhibit the color of the metal forming the weight. Alternatively, the weight may be colored at least partly differently from other components or marked with a sticker to improve the visibility. The material of the weight 510 preferably has a relatively high specific gravity such as stainless steel because the thickness and size of the weight can be reduced in that case, resulting in the reduction in the size of the impact detector 100. As the material forming the weight, other metals such as aluminum, for example, may also be used.

Herein, the specifications of the right and left planar member 310 and 320 required to detect a drop impact from a predetermined height with a predetermined weight can be obtained by calculation. More specifically, the amount of deformation of a leaf spring (first and second holding members 311, 321, 312, and 322) made of a predetermined material, having a predetermined cross-sectional shape, caused by impact energy from a predetermined height is calculated, and a necessary effective spring length is derived based on the calculated amount of deformation. Based on the calculation above, the respective dimensions of the first holding members 311 and 321 and the second holding members 312 and 322 are determined. It is to be noted that, if the effective length of the leaf spring is shorter compared with the diameter of the weight 510, the weight 510 cannot be separated from the leaf spring unless the amount of displacement (deformation) of the leaf spring is increased. However, increasing the amount of deformation of the leaf spring can increase the length of the end portion of the leaf spring in contact with the weight 510 and the time of contact therebetween. As a result, the leaf spring and the weight 510 engage with each other, and the weight 510 supported by the leaf spring fails to drop in some cases. Therefore, the effective length of the leaf spring needs to be relatively long compared with the diameter of the weight 510.

Next, operation of the impact detector 100 is described below.

FIGS. 11A through 11E schematically illustrate operation of the impact detector 100.

Figure 11A:
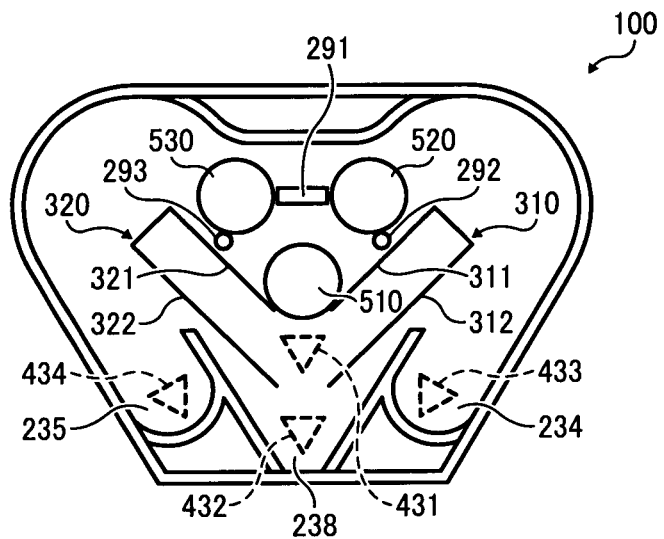
FIGS. 11A through 11E schematically illustrate operation of the impact detector.

In the initial state shown in FIG. 11A, the first weight 510 is held by the first holding members 311 and 321, the second weight 520 is held by the stop plate 291 and the weight supporter 292, and the third weight 530 is held by the stop plate 291 and the weight supporter 293. The first to third weights 510 to 530 are not visually observed through any of the display windows 431 to 434 in the initial state.

Figure 11B:
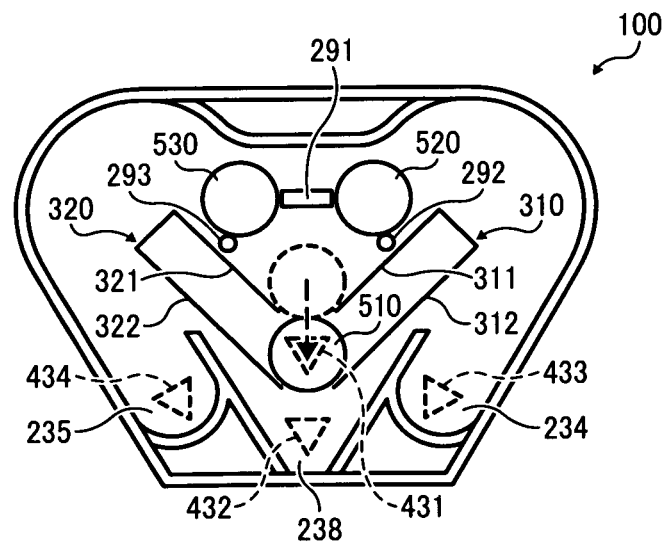

Upon an initial vertical drop (first drop) from the initial state, the first weight 510 pushes away the first holding members 311 and 321 from each other, drops, and then is held by the second holding members 312 and 322 as shown in FIG. 11B. Thereby, the first weight 510 is visually observable through the first display window 431.

Figure 11C:
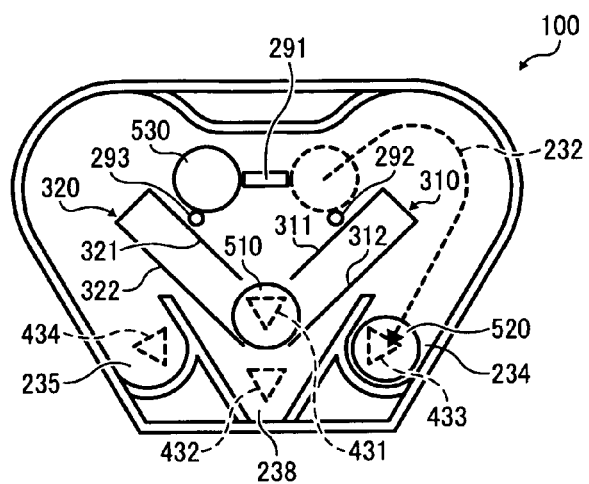

Upon a rightward tilt from the state shown in FIG. 11B, the second weight 520 rolls rightward in FIG. 11C, guided by the upper surface of the first holding member 311 of the right planar member 310, drops along the right transition path 232, and then is held by the right weight holding portion 234 as shown in FIG. 11C. In this state, the second weight 520 is visually observable through the third display window 433.

Figure 11D:
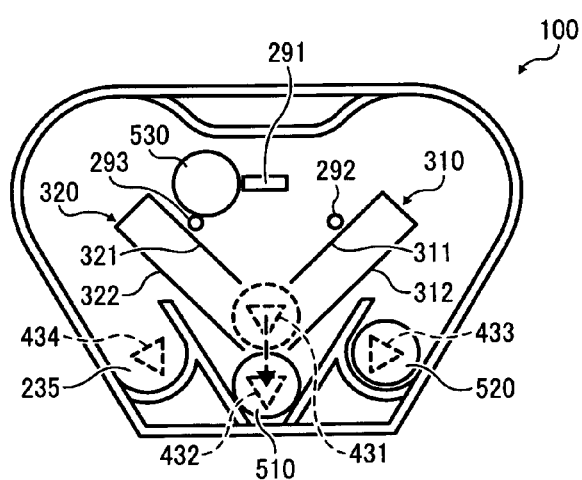

Upon a subsequent vertical drop (second drop) from the state shown in FIG. 11C, the first weight 510 pushes away the second holding members 312 and 322 from each other, drops, and then is held in the lower weight holding portion 238 as shown in FIG. 11D. Thereby, the first weight 510 is visually observable through the second display window 432. Thus, in the present embodiment, the impact caused by the drop can be detected twice with a single impact detector.

Figure 11E:
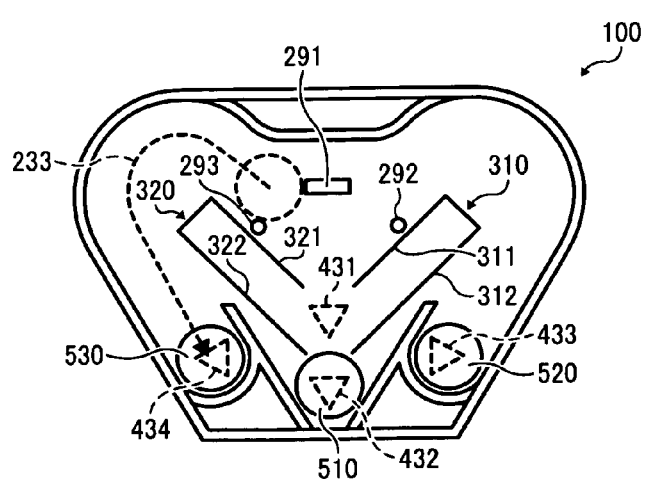

Upon a leftward tilt from the state shown in FIG. 11D, the third weight 530 rolls leftward in FIG. 11E, guided by the upper surface of the first holding member 321 of the left planar member 320, drops through the left transition path 233, and then is held in the left weight holding portion 235 as shown in FIG. 11E. In this state, the third weight 530 is visually observable through the fourth display window 434.

As described above, according to the present embodiment, the first to third weights 510 to 530 are visually observable through the display windows 431 to 434 in accordance with the first and second drops and the rightward and leftward tilts. Accordingly, the history of impact of drops and tilts of the impact detector 100 can be displayed with the first to third weights 510 to 530 visible through the display windows 431 to 434 of the impact detector 100.

Next, conjunction of the projections 221 through 226 with the pawls 540 and 550 is described below. When the packaging container including the impact detector 100 falls backward, that is, to the side of the rear case 200, movement of the second and third weights 520 and 530 is restricted as follows. When the jolting (vibration) of the second and third weights 520 and 530 are relatively great, as described above with reference to FIG. 10A through 10C, the second and third weights 520 and 530 respectively contact the pawls 540 and 550, and thus movement of the second and third weights 520 and 530 is restricted. By contrast, when jolting of the second and third weighs 520 and 530 is relatively small, it is possible that the second and third weighs 520 and 530 can slide on the sloped surfaces 541 and 551 of the pawls 540 and 550 or do not contact the pawls 540 and 550 and pass thereby, respectively. However, at that time, the second and third weights 520 and 530 can be stopped by the projections 221 through 223 and the projections 224 through 226 that are respectively provided downstream from the pawls 540 and 550 in the right transition path 232 and the left transition path 233. Thus, the second and third weights 520 and 530 do not move further also in this case. When the packaging container is returned to the initial state from the forward fall, the second and third weights 520 and 30 do not jolt but return to the respective initial positions along the right weight guide rails 263 and 264 and the left weight guide rails 265 and 266, respectively.

By contrast, when the packaging container falls forward, that is, to the side of the front case 400, circumferential edge portions of the second and third weights 520 and 530 respectively engages bottom portions of the sloped surfaces 541 and 551 of the pawls 540 and 550, and thus the second and third weights 520 and 530 stop. When the packaging container receives vertical impact, that is, falls from its lower corner, movement of the second and third weights 520 and 530 can be restricted as well in either of two manners depending on the magnitude of the impact. Therefore, in either case, erroneous detection can be prevented.

Next, a packaging container according to an embodiment of the present invention will now be described below with reference to FIGS. 12A through 12C.

Figure 12A:
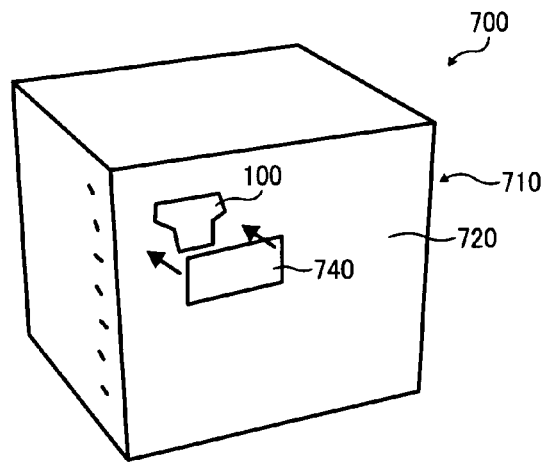
FIG. 12A is a schematic perspective view illustrating a packaging container including the impact detector.
Figure 12B:
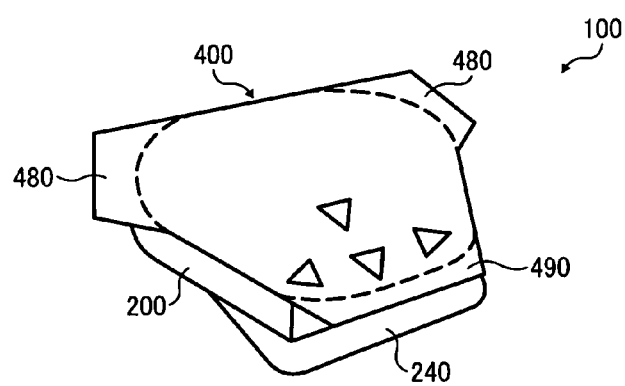
FIG. 12B is a schematic perspective view illustrating the impact detector attached to the packaging container shown in FIG. 12A.
Figure 12C:
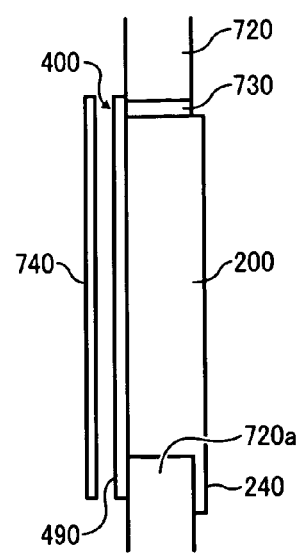
FIG. 12C is a schematic cross-sectional view illustrating the impact detector 100 attached to the packaging container.

FIGS. 12A through 12C are schematic diagrams illustrating a packaging container including the impact detector 100. FIG. 12A is a perspective view illustrating the packaging container, FIG. 12B is a perspective view illustrating the impact detector 100 attached to the packaging container shown in FIG. 12A, and FIG. 12C is a cross-sectional view illustrating the attached state of the impact detector 100.

Referring to FIG. 12A, a packaging container 700 according to the present embodiment includes a cardboard box 710 having a side surface 720 on which the impact detector 100 is attached. An opening 730 can be formed in the side surface 720 of the cardboard box 710 so that the impact detector 100 can fit in the opening 730 and attached to a vertical plane of an object stored in the packaging container 700.

To fit the impact detector 100 in the side surface 720 of the cardboard box 710, it is preferred that the rear case 200 should include the flange portion 240 and that the front case 400 should include overhang portions 480 as well as a lower projecting portion 490 as illustrated in FIG. 12B. With this configuration, a lower portion of the impact detector 100 is inserted in the opening portion 730 such that the flange portion 240 and the lower projecting portion 490 sandwich a lower edge portion 720a of the opening portion 730 as shown in FIG. 12C, and the overhang portions 480 is closely in contact with the outer surface of the side surface 720. Thereafter, the sealing member 740 is attached to cover the impact detector 100. Thereby, the impact detector 100 is reliably attached to the packaging container 700. Further, it is possible to prevent falsification, i.e., to prevent someone from removing the impact detector 100 from the cardboard box 710 and resetting the weights to the initial state when the cardboard box 710 receives an impact. In this case, it is preferred that an adhesive surface of the sealing member 740 includes a material containing glue so that the glue can be partly transferred and adheres to the surface of the front case 400 when the sealing member 740 is removed. Thereby, it is possible to check whether or not the impact detector 100 has been unsealed for falsification.

An impact detector according to a second embodiment is described below.

Figure 13:
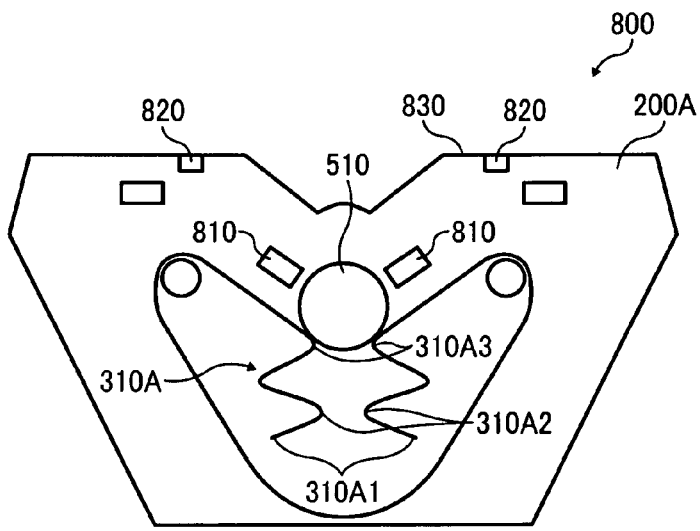
FIG. 13 is a schematic view illustrating an impact detector according a second embodiment.

FIG. 13 is a schematic view illustrating an impact detector 800 according the second embodiment.

The impact detector 800 includes a leaf spring 310A and a weight 510, both disposed inside a case 200A, and an interior of the case 200A and the leaf spring 310A together form a vertical transition path through which the weight 510 moves down when the case 200A is subjected an impact in a vertical direction as well as lateral transition paths through which the weight 510 moves when the case 200A is subjected to an impact in a direction oblique to the vertical direction. The impact detector 800 displays history of the impact to the packaged article with the position of the weight 510. The leaf spring 310A includes free ends 310A1 and projections 310A2 and 310A3 so that the position of the weight 510 in the vertical transition path can differ depending on the magnitude of the impact.

When the impact in the vertical direction, that is, the impact from below is relatively small, the weight 510 remains at an initial position supported by the upper projections 310A3 of the leaf spring 310A. By contrast, when the impact from below is sufficiently great for the weight 510 to push away the projections 310A3 from each other, the weight 510 expands the gap between the projections 310A3, moves down, and then is caught between the lower projections 310A2. When the impact is greater, the weight 510 further pushes away the lower projections 310A2 from each other and moves down to the bottom of the case 200A. At that position, the weight 510 is visible through an inspection window (not shown) formed in a bottom portion of the case 200A. Additionally, with the projections 310A2, the weight 510 does not move toward the initial position. By contrast, when the packaged article falls in a lateral direction, the weight 510 moves through the lateral transition path, beyond a curved portion of the leaf spring 310A, and stops on a lower left or right of the leaf spring 310A in FIG. 13.

The impact detector 800 further includes pawls 810 and projections 820. The pawls 810 are disposed close to the initial position of the weight 510 and have a configuration similar to that in the first embodiment. The projections 820 are disposed on the left and the right of an upper center portion 830, respectively. In the present embodiment, although pawls 810 and the projections 820 prevent the weight 510 from moving when the impact detector 800 receives impact that is not to be detected, the weight 510 can move smoothly when the impact detector 800 is dropped or falls laterally similarly to the first embodiment. Thus, the history of impact in the predetermined directions can be displayed.

An impact detector according to a third embodiment is described below.

Figure 14:
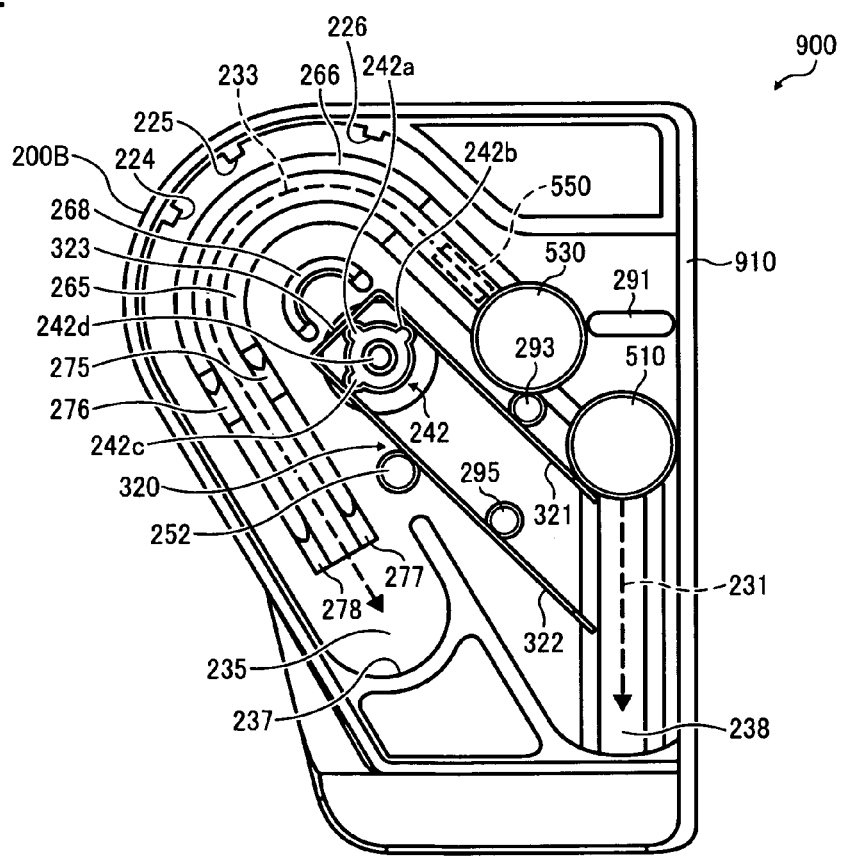
FIG. 14 is a plan view from a front side illustrating an impact detector according a third embodiment.

FIG. 14 is a plan view from a front side illustrating an impact detector 900 according the third embodiment.

The impact detector 900 according to the present embodiment has a configuration similar to the left half of the impact detector 100 according to the first embodiment described above, and is similar to the impact detector 100 according to the first embodiment in other configurations. Therefore, the corresponding components are given the identical reference characters, and description thereof is omitted.

In the present embodiment, the first weight 510 is held by the left planar member 320 and a wall portion 910 of a rear case 200B. Upon a drop impact, the first weight 510 moves through the vertical transition path 231 while deforming the first holding member 321 and the second holding member 322. Additionally, upon a tilt to one side (to the left in FIG. 14), the third weight 530 moves through the left transition path 233. Thus, the impact detector 900 can detect two drops and a tilt to one side with a simple configuration.

An impact detector according to a fourth embodiment is described below.

Figure 15:
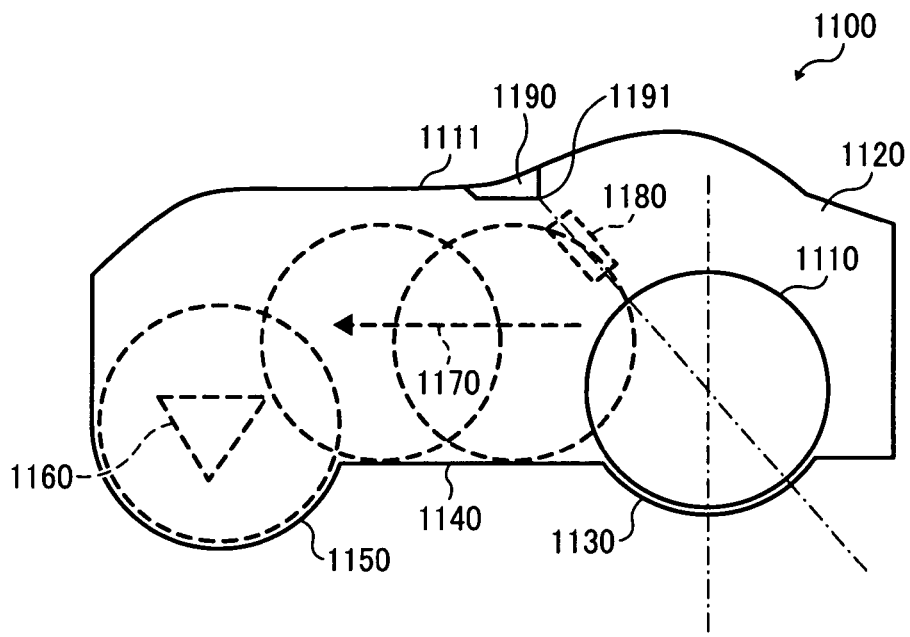
FIG. 15 is a schematic view illustrating an impact detector according a fourth embodiment.
Figure 16:
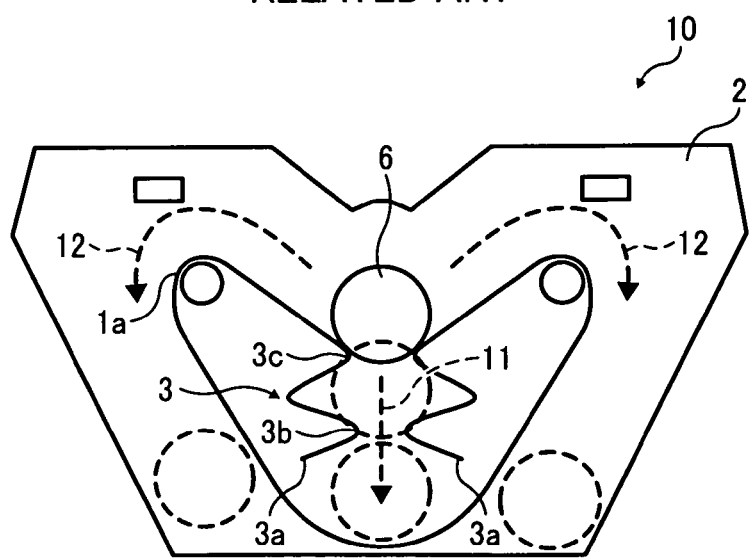
FIG. 16 schematically illustrates a related-art impact detector.

FIG. 15 is a schematic view illustrating an impact detector 1100 according the fourth embodiment.

The impact detector 1100 according to the present embodiment includes a circular planar weight 1110 contained in a case 1120, detects a fall in a single direction, and displays the fall. The case 1120 includes an initial recessed portion 1130 in which weight 1110 is held in an initial state, an lower wall 1140 on which the weight 1110 rolls, an impact detection recessed portion 1150, and a display window 1160. When the impact detector 1100 is tilted a predetermined angle in a counterclockwise direction in FIG. 15, the weight 1110 moves out from the initial recessed portion 1130, fits in the impact detection recessed portion 1150, and is visible through the display window 1160. A transition path 1170 through which the weight 1110 moves is formed above the lower wall 1140.

Additionally, a pawl 1180 and a projection 1190 are provided in the case 1120. The pawl 1180 has a configuration similar to that of the pawls 540 and 550 in the first embodiment and reduces the transition path 1170 in the size in the direction of thickens of the weight 1110, thereby restricting movement of the weight 1110 when the weight 1110 vibrates. The projection 1190 is provided on an upper wall 1111 positioned above the lower wall 1140 (transition path 1170) and includes a corner 1191 positioned facing the weight 1110 held in the initial recessed portion 1130.

In the present embodiment, when the impact detector 1100 is tilted a predetermined angle in the counterclockwise direction in FIG. 15, the weight 1110 moves out from the initial recessed portion 1130 and fits in the impact detection recessed portion 1150. Additionally, when the impact detector 1100 is dropped or falls in an anteroposterior direction, the pawl 1180 and the projection 1190 prevent the weight 1110 from moving to the impact detection recessed portion 1150. Consequently, the impact detector 1100 detects impact in only the predetermined direction and does not detect impact erroneously.

Numerous additional modifications and variations are possible in light of the above teachings. It is therefore to be understood that, within the scope of the appended claims, the disclosure of this patent specification may be practiced otherwise than as specifically described herein.

What is claimed is:

1. An impact detector comprising:
   a weight having a circular periphery;
   a case in which the weight is contained, an interior of which defines a transition path that connects an initial position and a detection position and through which the weight moves to the detection position with a circumferential surface of the weight in contact with the interior of the case when the case receives at least one of an impact and a force in a predetermined direction; and
   a restriction portion projecting from the interior of the case into the transition path to restrict movement of the weight toward the detection position when the case receives at least one of an impact and a force in a direction other than the predetermined direction while the weight is in the initial position.

2. The impact detector according to claim 1, wherein the case comprises opposing walls that sandwich therebetween the weight in a direction of thickness of the weight and together form the transition path,
   the restriction portion includes a protrusion portion provided on at least one of the opposing walls of the case, and
   the protrusion portion allows the movement of the weight toward the detection position when the impact detector falls in a direction to be detected and inhibits the movement of the weight when the impact detector falls in a direction other than the predetermined direction.

3. The impact detector according to claim 2, wherein the protrusion portion of the restriction portion reduces the transition path in length in the direction of thickness of the weight.

4. The impact detector according to claim 2, wherein the protrusion portion of the restriction portion includes a sloped surface sloped in a direction to reduce the transition path in length in the direction of thickness of the weight toward downstream in a weight transition direction in which the weight moves when the case receives the at least one of the impact and the force in the predetermined direction.

5. The impact detector according to claim 4, wherein the length of the transition path in the direction of thickness of the weight at a position corresponding to the protrusion portion is greater than a thickness of the weight.

6. The impact detector according to claim 4, wherein the protrusion portion of the restriction portion further comprises a corner continuous with a downstream end of the sloped surface in the weight transition direction in which the weight moves when the case receives the at least one of the impact and the force in the predetermined direction.

7. The impact detector according to claim 6, wherein the protrusion portion of the restriction portion further comprises a surface substantially in parallel to the opposing walls, disposed downstream from the corner in the weight transition direction in which the weight moves when the case receives the at least one of the impact and the force in the predetermined direction.

8. The impact detector according to claim 2, wherein the protrusion portion of the restriction portion is disposed close to the initial position of the weight.

9. The impact detector according to claim 2, wherein a length of the protrusion portion of the restriction portion along the transition path, perpendicular to the direction of thickness of the weight, is substantially identical to a radius of the weight.

10. The impact detector according to claim 1, wherein the case comprises an upper wall and a lower wall that sandwich therebetween a circumference of the weight and together form the transition path,
    the restriction portion comprises a projection provided on the upper wall, and
    the projection allows the movement of the weight toward the detection position when the impact detector falls in a direction to be detected and inhibits the movement of the weight when the impact detector falls in a direction other than the predetermined direction.

11. The impact detector according to claim 10, wherein the projection of the restriction portion reduces the transition path in size in a direction perpendicular to the direction of thickness of the weight.

12. The impact detector according to claim 10, wherein the case further comprises a guide wall disposed above the initial position of the weight for guiding the weight from the initial position to the transition path, and
    the projection of the restriction portion is disposed downstream from the guide wall in the direction in which the weight moves when the case receives the at least one of the impact and the force in the predetermined direction.

13. A packaging container comprising:
    a container in which an article is contained; and
    the impact detector according to claim 1.

14. An impact detector comprising:
    a weight having a circular periphery;
    a case in which the weight is contained, an interior of which defines a transition path that connects an initial position and detection position, the transition path through which the weight moves to the detection position with a circumferential surface of the weight in contact with the interior of the case when the case receives at least one of an impact and a force in a predetermined direction; and
    a restriction means for restricting movement of the weight toward the detection position when the case receives at least one of an impact and a force in a direction other than the predetermined direction.

\* \* \* \* \*